March 27, 1951  G. E. HATCHER  2,546,262
FLIGHT CONVEYER
Filed Oct. 7, 1946
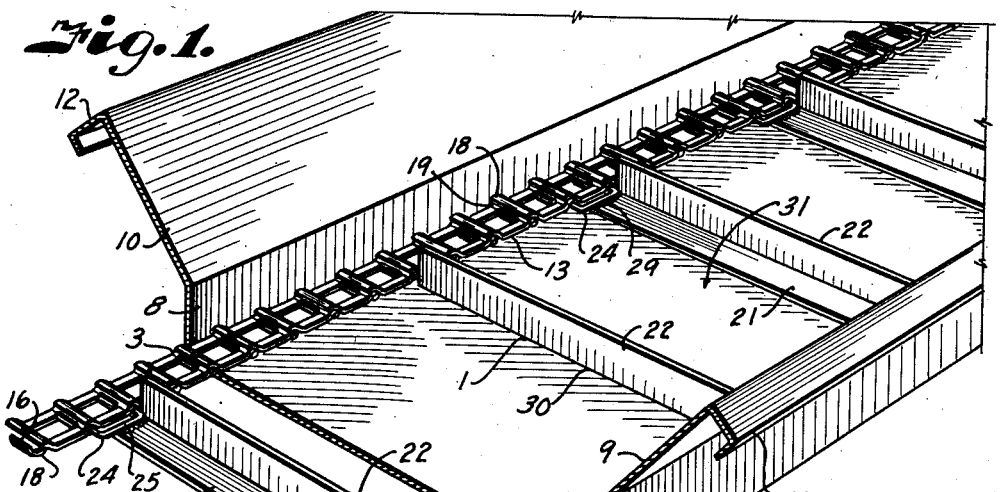
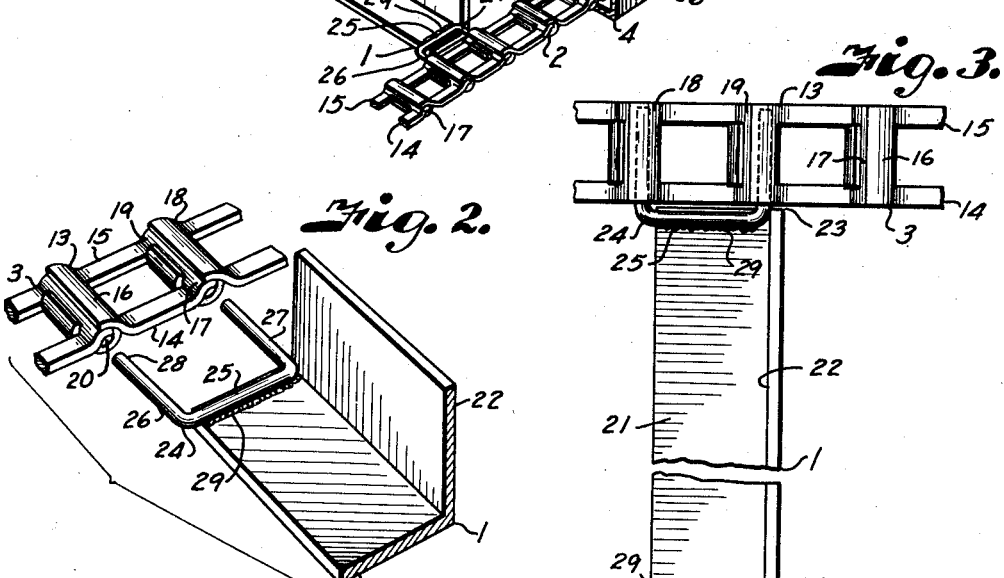
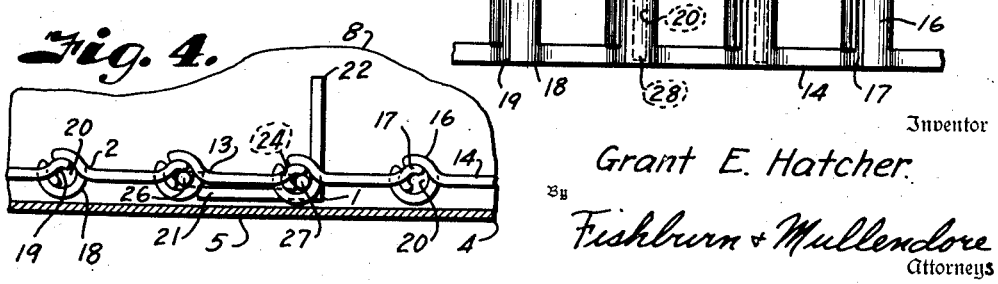
Inventor
Grant E. Hatcher.
By Fishburn & Mullendore
Attorneys Patented Mar. 27, 1951

2,546,262

UNITED STATES PATENT OFFICE 2,546,262

FLIGHT CONVEYER

Grant E. Hatcher, Lee's Summit, Mo., assignor to Sam Mulkey Company, Kansas City, Mo., a partnership composed of Stanley A. Mulkey and Lucile Mulkey Application October 7, 1946, Serial No. 701,678

3 Claims. (Cl. 198—175)

This invention relates to flight conveyors and more particularly to the flight structure and mounting thereof on suitable carriers, such as chains and the like, and for use on elevators or conveyors employed in transferring material horizontally or at an incline, either up or down, said conveyors being especially desirable where the inclination is too steep for use of apron or belt conveyors.

Flight conveyors are usually formed by attaching flights to strands of chains or other suitable carriers movable in a trough to push the material therealong. The flights may slide on the bottom of the trough or be carried by wearing shoes or other suitable means. Spacing of the flights is usually varied to suit the type of material, size of lumps or articles, capacity, and inclination of the conveyor. In conventional practice flight conveyors, particularly those using chain as carriers, are constructed by providing wings or flanges on selected links of the chain and fastening angles or other suitable flights thereto by means of bolts and the like. Such structure requires considerable time for assembly and has other disadvantages, the principal one being that the time and expense of varying the spacing or arrangement of the flights to meet the variable conditions encountered as when employed on farms or other general use requiring the transfer of a variety of materials, is substantially prohibitive.

The principal objects of the present invention are to provide a flight adapted to be connected to substantially any link in a chain carrier; to provide a connecting device on the flight adapted to resiliently engage a chain carrier to secure the flight thereto; to provide for mounting a conveyor flight to a chain carrier by means having frictional engagement therewith; to provide a flight conveyor with flights adapted to snap a mounting on the carriers; to provide a conveyor flight that is reversible on the conveyor carrier; to provide fastening means for conveyor flights that are quickly and easily engaged or disengaged with the conveyor carrier; and to provide a conveyor flight of this character that is strong, durable, of economical structure and capable of efficient use.

In accomplishing these and other objects of the present invention, I have provided improved details of structure, the preferred forms of which are illustrated in the accompanying drawings, wherein:

Fig. 1 is a perspective view of a portion of a conveyor type elevator equipped with flights and mounting structure therefor embodying the features of the present invention.

Fig. 2 is a perspective view illustrating a conveyor chain carrier and conveyor flight in spaced, disassembled relation.

Fig. 3 is a plan view of the conveyor chain carrier with a conveyor flight applied thereto.

Fig. 4 is a side elevational view of the conveyor chain carrier and flight applied thereto.

Referring more in detail to the drawings:

I designates a conveyor flight adapted to be connected with suitable conveyor carriers such as chains 2 and 3 which operate in a trough 4 of suitable construction. The trough may vary depending upon the service in which it is adapted to be employed and the material to be transferred thereby. In the particular structure illustrated the trough consists of a bottom 5, preferably coextensive with the length of the conveyor and of any suitable width. The sides of the trough bottom are turned upwardly as at 6 to provide side walls 7 and 8 preferably of greater depth than the height of the flights, said side walls 7 and 8 terminating in outwardly flared portions 9 and 10, the outer edges of which are provided with outwardly and downwardly extending flanges 11 and 12 to provide substantial strength to the walls of the trough.

The carriers 2 and 3 are preferably formed of endless strands of chain links adapted to be moved along the bottom of the trough adjacent the side walls 7 and 8 respectively by means of sprockets or other suitable driving means (not shown). As in conventional practice, the chains may be suitably tightened and are kept in alignment by the sprockets for driving same. The trough and chain carriers form no part of the present invention except in the manner in which they cooperate with the conveyor flights and the mounting therefor.

The conveyor carrier chains are illustrated as chain commonly known as detachable link agricultural chain, however, any suitable chain may be used that has openings at the ends of the respective links or is provided with means on the links suitable to receive the flight fastening means as later described. Agricultural chain such as illustrated consists of a plurality of links 13 coined out of flat stock in such a manner that each link consists of spaced longitudinal bars 14 and 15 connected at their ends by cross members 16 and 17 which are arcuate in cross-section. The cross members 16 and 17 are preferably bent upwardly and portions of the material cut from between the bars 14 and 15 are bent downwardly to cooperate with the respective cross members 16 and 17 to form terminal ends 18 and 19 of the link. The terminal ends are formed whereby the outer radius of the terminal end 19 is substantially the same as the inner radius of the terminal end 18. The ends of cross member 16 and the downwardly bent portion cooperating therewith to form terminal end 18 are spaced sufficiently to pass the thickness of the bars 14 and 15, whereby the terminal end 19 of one link may be inserted in the terminal end 18 of the adjacent link to form a bearing and a pivotal connection between the respective links. All of the links of the chains 2 and 3 are of the type described, no special links being required.

As illustrated particularly in Fig. 4, the shapes of the terminal ends of the links are such that when assembled there is an opening 20 inside the terminal portions at each pivotal connection of the respective links.

The flights 1 may be of any suitable structure but preferably consist of an angular member having a flange 21 adapted to be disposed in substantially parallel relation at the bottom of the trough 4 while moving thereover. The other flange 22 of the flight member extends upwardly from the flange 21 and may be of any suitable height depending upon the material to be transferred by the conveyor. The flange 22 may be of any suitable length, but is illustrated as being coextensive with the flange 21 which is preferably of such length that it may be positioned transversely of the chain carriers 2 and 3 with suitable clearance 23 between the ends of the flight and said chain carriers.

The fastening means 24 for securing the flights to the chain carriers preferably consists of members formed of round stock and shaped to provide a bar 25 terminating in legs 26 and 27 preferably having slightly different spacing at their outer ends 28 than adjacent the bar portion 25, providing spring tension when said legs are held in parallel relation. The bar portions 25 of the fastening means are suitably secured to the flange 21 of the flight member as by welding 29 to hold the fastening means securely and rigidly on the conveyor flight.

The legs 26 and 27 of the fastening means 24 are of such size to pass freely into the openings 20 at the terminal ends of the chain links, the bar 25 and the spacing of the legs 26 and 27 adjacent the bar 25 being of such length as to correspond substantially to the spacing between the openings 20 of adjacent links. It will be readily seen that by slightly compressing the outer ends of the legs 26 and 27, said legs may be inserted into the openings 20 and when the pressure on the legs 26 and 27 is released there will be a sufficient spring tension applied thereby to the terminal ends of the respective links to securely hold the flight 1 connected with the chain carrier.

In assembling a flight on the conveyor carriers, the inside portion of one of the chain carriers is tilted upwardly and the legs 26 and 27 of the flight fastening means inserted into the openings 20 of adjacent chain links and moved therein until there is only slight spacing between the flights and the chain links. The chain carrier in which the flight has been inserted is then lifted and the opposite end of the flight tilted downwardly while the inside portion of the other chain carrier is tilted upwardly whereby the outer ends 28 of the flight fastening means 24 are aligned with and inserted into the openings 20 of links directly opposite the links to which the first means 24 was applied.

In constructing a conveyor of this type the flights are usually equally spaced along the chain carriers and the vertical flange 22 is usually in the direction of travel of the carriers. However, in using and operating a device of this character, due to variation in the types of material and size of articles being transferred by the conveyor, it is frequently desirable to change the spacing of the flights thereon. The conveyor may be stopped, one of the carrier chains lifted until the legs 26 and 27 of the fastening device 24 on that side of the conveyor is withdrawn from the openings 20 in the links of the chain. The other fastening device 24 may then be withdrawn from the other chain and the flight moved to any desirable position on the chain and reapplied thereto as described in assembling the flight to the chain.

It is to be noted in the particular type of chain illustrated the spacing between the openings 20 is the same for each link in the chain. Therefore, flights may be placed in any desired spacing, and as close as at every other link of the chain. Both of the connecting members 24 are constructed exactly alike, therefore the flights may be reversed in direction as illustrated in Fig. 1 at 30, whereby the flanges 21 of adjacent flights may be directed toward each other to provide a pocket effect 31 in the conveyor. While the legs 26 and 27 of the fastening means 24 will pivot with the link adjacent to which they are mounted, the spaced engagement of the legs with the respective links will keep the flight in alignment therewith and not permit pivotal movement of the flight relative to the chain link.

It is believed obvious that I have provided a conveyor flight and mounting therefor by which the flight may be easily applied to and removed from the conveyor carrier, arranged in any desired spacing thereon and securely held in place by the slip frictional connection between the flights and the conveyor carrier chain links.

What I claim and desire to secure by Letters Patent is:

1. In a flight conveyor, spaced carrier chains formed of detachable links having mating ends pivotally engaged for connecting said links, said chains having openings equally spaced therein substantially at the axes of the pivotally engaged mating ends, conveyor flights arranged transversely between said chains, and a pair of outwardly projecting legs on each end of said flights extending into adjacent openings of said chains, the outer ends of said legs having different spacing than said adjacent openings for frictional engagement therein to secure the flights thereto.

2. In a flight conveyor, spaced carrier chains formed of a plurality of detachable links having mating ends pivotally engaged for connecting said links, said chains having transverse openings substantially at the axes of the pivotally engaged mating ends of said links, conveyor flights arranged transversely between said chains, U-shaped means secured to the conveyor flights adjacent the ends thereof, and outwardly projecting spaced legs on said U-shaped means adapted to be slidably and frictionally engaged in adjacent transverse openings of the respective chain.

3. In a flight conveyor, spaced carrier chains formed of a plurality of pivotally connected links, said chains having a plurality of spaced transverse openings, conveyor flights arranged transversely between said chains, and a pair of spaced substantially parallel outwardly projecting legs on each end of said flights, said legs having free ends slidably and pivotally mounted in spaced transverse openings of said chains, the outer ends of each pair of legs having different spacing than the respective transverse openings for frictionally and resiliently engaging therein to removably secure the flights thereto.

GRANT E. HATCHER.

REFERENCES CITED

The following references are of record in the file of this patent:

UNITED STATES PATENTS

| Number | Name | Date |
|---|---|---|
| 331,703 | Grater | Dec. 1, 1885 |
| 401,285 | Loree | Apr. 9, 1889 |
| 492,007 | Gould | Feb. 21, 1893 |
| 977,832 | Pando | Dec. 6, 1910 |
| 1,230,700 | Gledhill | June 19, 1917 |
| 1,560,716 | Newdick | Nov. 10, 1925 |
| 1,683,653 | Brown | Sept. 11, 1928 |
| 1,748,033 | Bennett | Feb. 18, 1930 |
| 1,787,063 | Cano | Dec. 30, 1930 |
| 2,100,959 | Hurxthal | Nov. 30, 1937 |
| 2,387,918 | Lockwood | Oct. 30, 1945 |